Feb. 16, 1937.  W. D. SARGENT  2,070,847
BRAKE DRUM
Filed Aug. 1, 1931
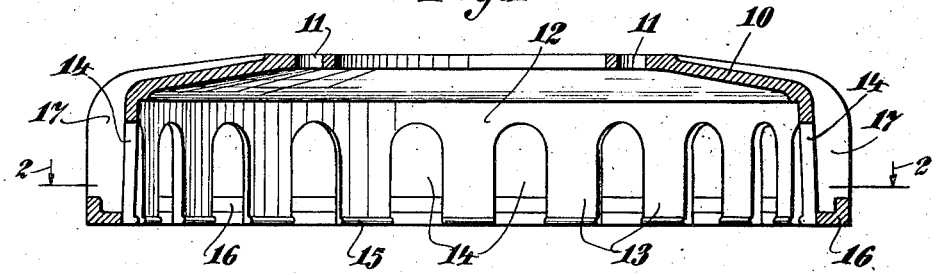
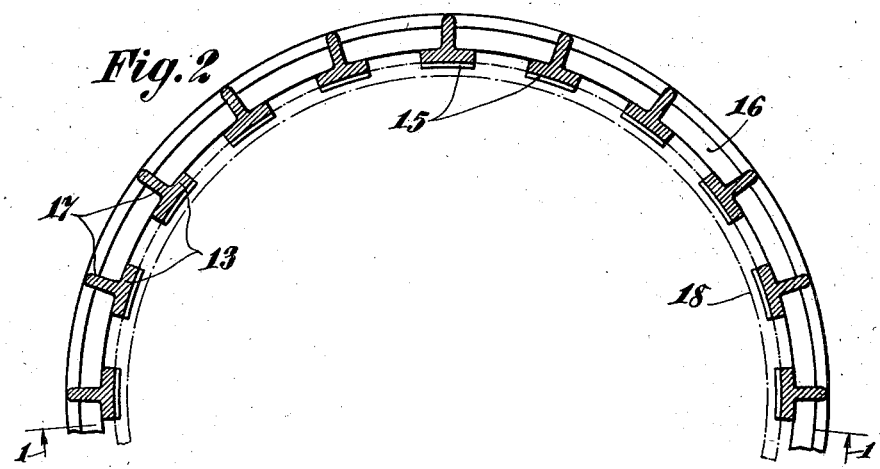
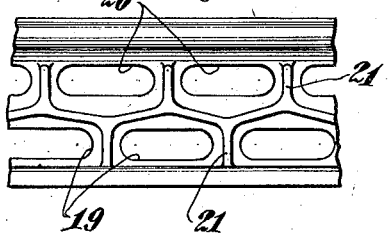
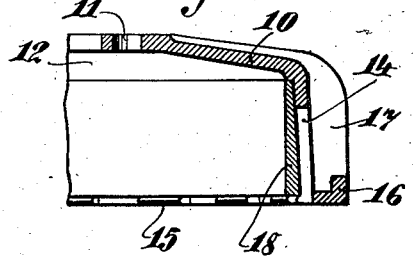
INVENTOR
William D. Sargent,
BY
His Attorneys Patented Feb. 16, 1937

2,070,847

UNITED STATES PATENT OFFICE 2,070,847

BRAKE DRUM

William D. Sargent, New York, N. Y., assignor, by mesne assignments, to Durafer (Inc.), Dover, Del., a corporation of Delaware Application August 1, 1931, Serial No. 554,524

9 Claims. (Cl. 188—218)

The present invention relates to brake drums and embodies, more specifically, an improved brake drum including a shell and liner whereby cooling of the drum is materially improved over existing forms of drums.

More particularly, the invention embodies an improved brake drum construction, wherein the shell is formed to provide for the ventilation thereof effectively and thus cool the drum in operation. It has been found that brake drums, under severe operation, become greatly overheated. In order to provide a brake drum wherein the temperature of the shell and liner is maintained within certain desired limits, the present invention has been designed and an object thereof is to provide a brake drum wherein heat generated therein is effectively dissipated.

A further object of the invention is to provide a brake drum, formed of a shell and liner, wherein the shell is effectively ventilated to maintain the heat thereof within predetermined limits.

A further object of the invention is to provide a brake drum formed of a shell and liner, the shell of which is formed with means to facilitate the ventilation of the shell and liner.

A further object of the invention is to provide a brake drum construction including a shell and liner, wherein the shell is formed with air spaces communicating with the liner to facilitate the cooling thereof.

A further object of the invention is to provide an improved brake drum including a shell and liner, the shell being formed to facilitate the cooling of the liner without detracting from the strength thereof, the elements being simple in construction and readily manufactured.

Further objects, not specifically enumerated above, will be apparent as the invention is described in greater detail in connection with the accompanying drawing, wherein:

Figure 1 is a view in section, taken on line 1—1 of Figure 2, and looking in the direction of the arrows.

Figure 2 is a view in section, taken on line 2—2 of Figure 1, and looking in the direction of the arrows.

Figure 3 is a segmental view in section, showing a brake drum constructed in accordance with the present invention, said drum including a shell in accordance with Figure 1 and provided with a suitable liner.

Figure 4 is a view in side elevation, showing a modified form of drum.

With reference to Figures 1 and 2, a brake drum is shown as formed with a spider 10 having bolt holes 11 to facilitate securing the same to a wheel hub. The spider is formed with a shell 12 having a plurality of parallel elements 13 spaced by grooves 14. The ends of the elements are formed with ribs 15 to prevent extrusion of a liner mounted within the elements.

A circumferential flange or ring 16 serves as a dust guard and each element 13 is formed with a web or rib 17 which extends from the ring 16 to the remote portions of the spider 10. Webs 17 not only serve as a strengthening means for the elements 13, but also promote the circulation of air about the outer surface of the elements 13 during rotation.

Within the shell 12, a suitably formed liner 18 is mounted, the securing of the liner within the shell being effected by heating the latter and shrinking the same on the liner. In this connection, the rib 15 is of such size as to permit the shrinking operation to take place without excessive heating of the shell.

As shown in Fig. 3, the inner surface of the shell and the outer surface of the brake drum may have a slight taper, although not essential, but nevertheless have corresponding surfaces which may closely contact one another.

In Figure 4, a shell is illustrated as being formed with a plurality of circumferentially extending apertures 19 and 20, the apertures being in staggered relationship. Between the apertures, webs 21 are formed to strengthen the shell and facilitate the circulation of air about the apertures.

In manufacturing brake drums in accordance with the present invention it has been found that the procedure is greatly simplified by utilizing centrifugally cast liners for insertion into the metal shell. In this connection the centrifugally cast liners require no finishing operations and may be effectively fitted into or welded in the shell, as described above. The shell is preferably of malleable metal and the centrifugally cast liner inserted thereinto results in a highly effective brake drum construction.

From the foregoing, it will be seen that a highly serviceable brake drum construction has been provided which is formed with means for facilitating the cooling of the drum by providing air spaces which communicate with the liner. The provision of a centrifugally cast liner suitably secured to a maleable metal shell affords an ideal brake drum construction and overheating thereof is effectively prevented by the provision of the air spaces and ribs which agitate the air about the drum and prevent stagnation thereof.

While the invention has been described with specific reference to the accompanying drawing, it is not to be limited, save as defined in the appended claims.

I claim as my invention:

1. A brake drum comprising a shell having a tapered inner surface and a metallic liner wholly within the shell supported by the shell having a correspondingly tapered outer surface in engagement with the entire inner shell surface, said shell being formed with apertures extending perpendicular to the rotational axis of the shell and outwardly from the shell to expose the liner to the air about the shell.

2. A brake drum comprising a shell having an inner tapered surface, a liner secured in the shell having a corresponding outer tapered surface in engagement with the inner shell surface, said shell being cut away to form spaced elements, a circumferential flange secured to the ends of the elements, and ribs on the elements.

3. A brake drum comprising a shell having an inner tapered surface, a liner secured in the shell having a corresponding outer tapered surface, said shell being cut away to form spaced elements parallel to the axis of the shell, radial ribs on the elements, and a circumferential flange secured to the ends of the elements, said elements at their ends having radially inwardly extending lips for holding the liner in place.

4. A brake drum comprising a shell having an inner axially-extending surface, and a metallic liner supported by and wholly within the shell and having an outer axially-extending surface in contact with the entire inner shell surface, said shell being formed with apertures of greater axial length than circumferential width extending perpendicular to the rotational axis of the shell and outwardly from the shell to expose the liner to the air about the shell.

5. A brake drum comprising a shell having an inner axially-extending surface, a liner secured in the shell having an outer surface in contact with the said entire inner shell surface, said shell being cut away to form spaced elements, a circumferential flange secured to the ends of the elements, and ribs on the elements.

6. A brake drum comprising a shell having an inner surface, a liner secured in the shell having a corresponding outer surface, said shell being cut away to form spaced elements parallel to the axis of the shell, radial ribs on the elements, and a circumferential flange secured to the ends of the elements, said elements at their ends having radially inwardly-extending lips for holding the liner in place.

7. A brake drum comprising a shell having an inner axially-extending surface, a liner secured in the shell having an outer surface in contact with the entire inner shell surface, said shell being cut away to form spaced elements, and radially and axially-extending ribs on the elements for promoting fanning action.

8. A brake drum comprising a shell having an inner surface, and a metallic liner supported by and wholly within the shell having a corresponding outer surface, said shell being formed with apertures comprising axial slots extending inwardly from the edge of the shell, and a circumferential rim joining the elemental portions of the shell formed by said slots, said rim being spaced radially from the outer surface of said liner.

9. A brake drum comprising a shell having a tapered inner surface and a metallic liner supported by and wholly within the shell having a correspondingly tapered outer surface in engagement with the entire inner shell surface, said shell being formed with apertures of greater axial length than circumferential width extending perpendicular to the rotational axis of the shell and outwardly from the shell to expose the liner to the air about the shell.

WILLIAM D. SARGENT.